United States Patent Office 2,731,848
Patented Jan. 24, 1956

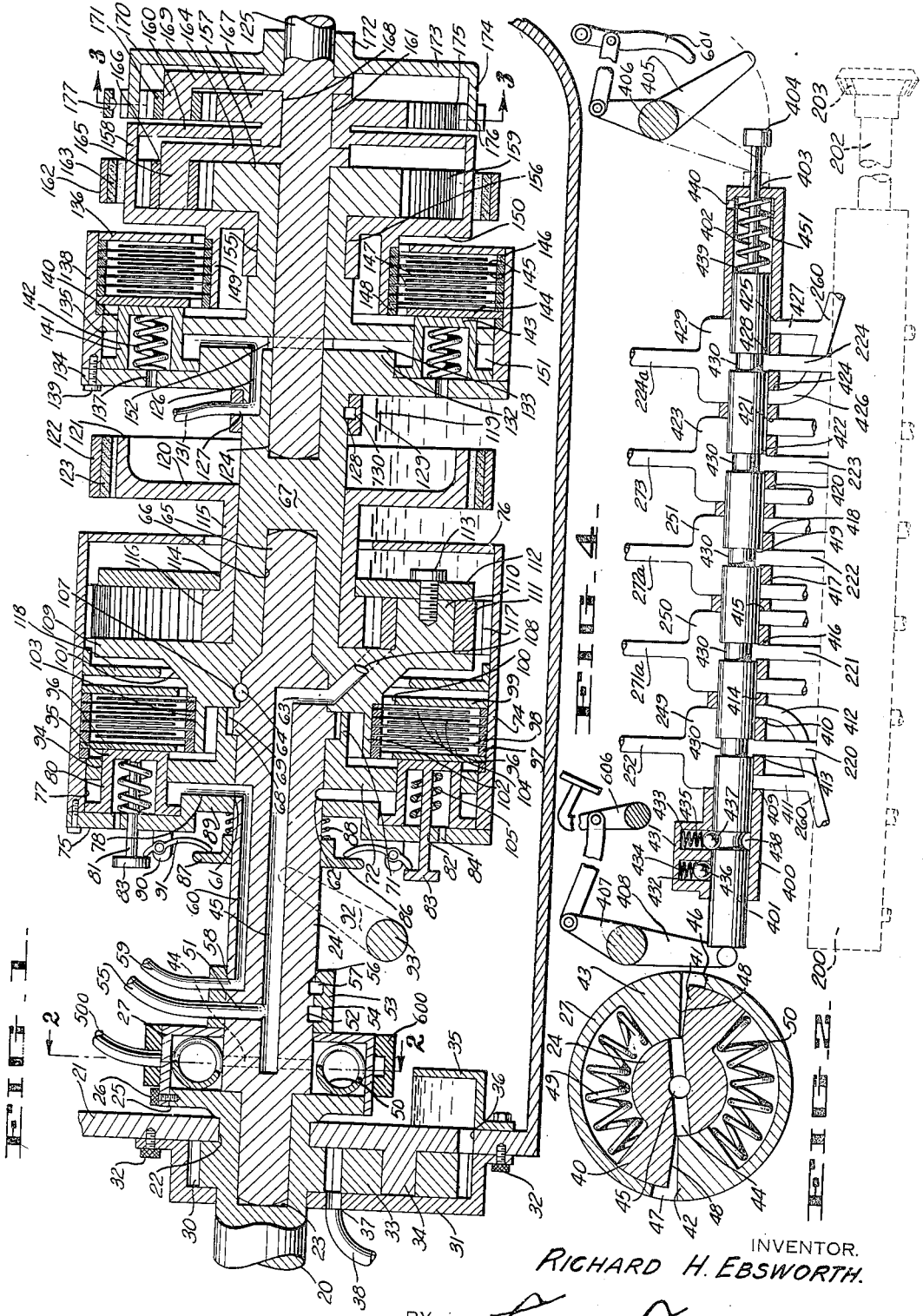

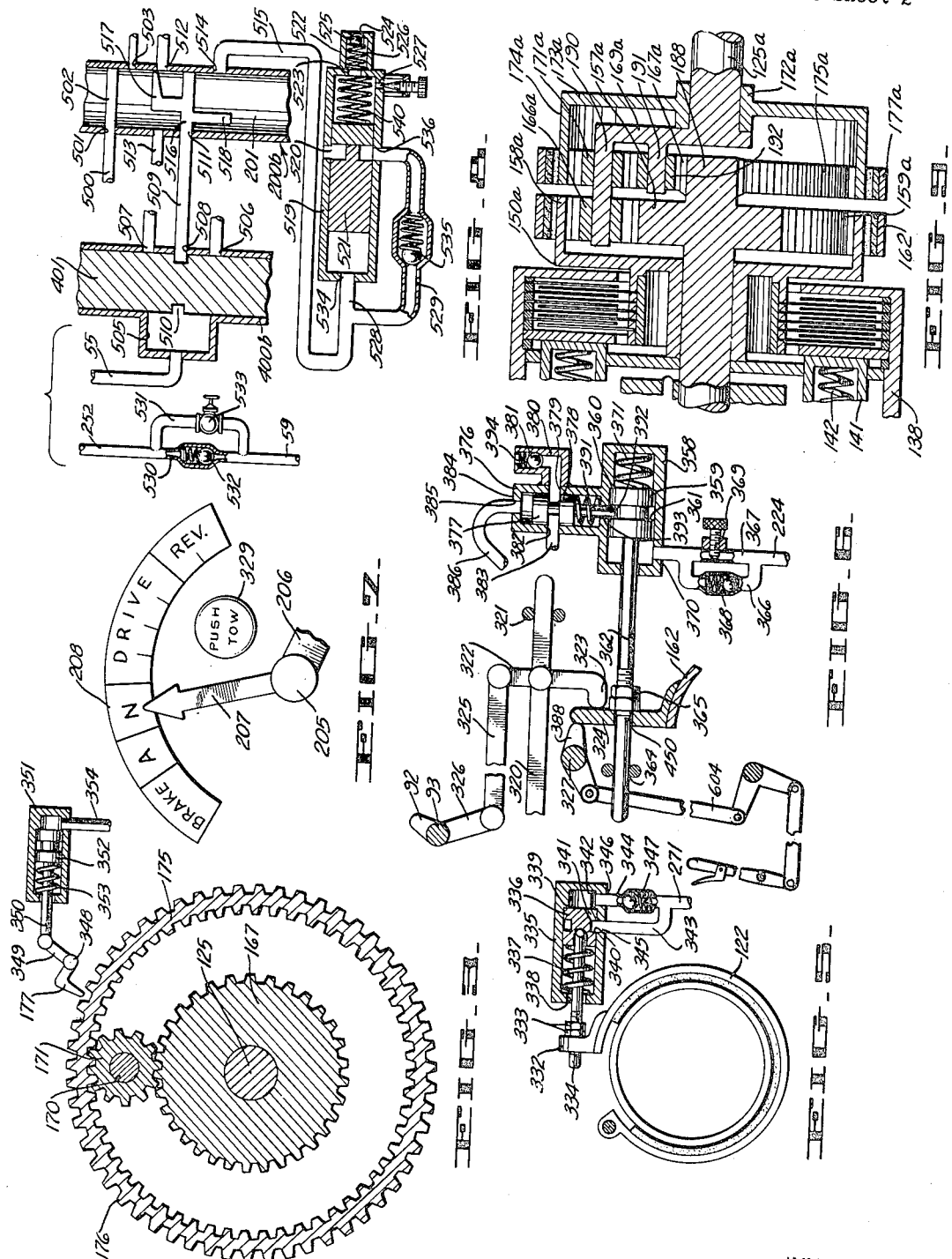

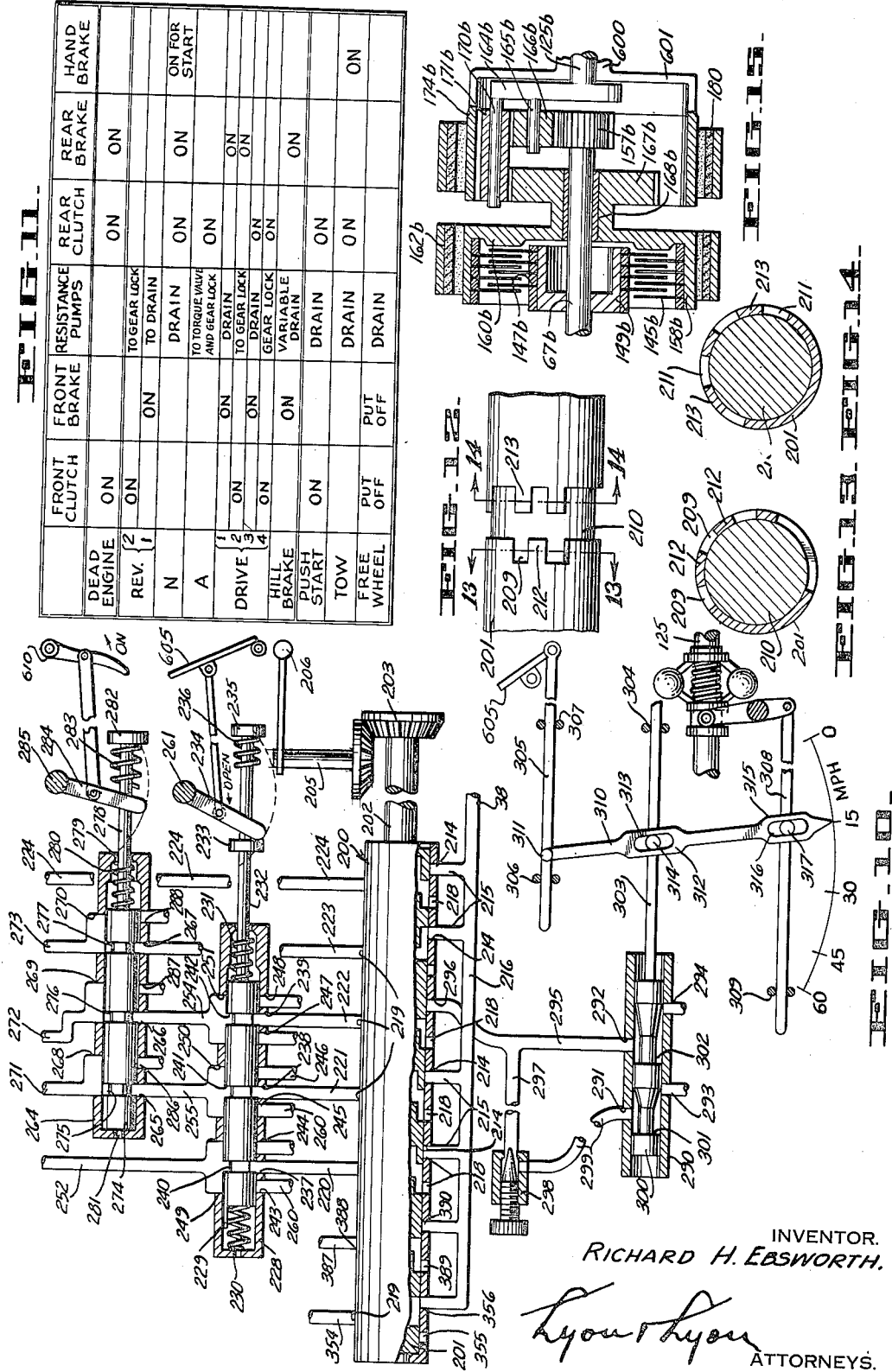

2,731,848
POWER TRANSMISSION
Richard H. Ebsworth, Laguna Beach, Calif.
Application March 7, 1950, Serial No. 148,227
23 Claims. (Cl. 74—472)

This invention relates to power transmissions, more particularly in automobiles and of the kind in which no gears are shifted, and especially to a power transmission which includes automatic mechanism serving to furnish an infinite range of gear ratio between the driving and driven shafts.

The invention comprises front and rear planetary gearsets, front and rear clutches spring actuated and hydraulically disengaged and front and rear brakes adapted to hold a gear in each gearset stationary to serve as a reaction gear for forward driving and a brake to hold an annulus gear in said rear gearset stationary for reverse drive.

It is another feature of this invention that control means are provided for producing automatic change of gear ratio in response to the torque applied to the driven shaft which mechanism includes a pump and means to lessen the resistence to the discharge of said pump in step with an increase in the torque transmitted.

It is a further feature of this invention that gear members in the front planetary gearset are utilized to provide the resistance pump; said members being fitted with a casing and performing their pumping function without the use of any cooperating gears external to the said casing.

Other advantages, objects and features of this invention include a positive neutral with no creeping; a choice of infinite range or four fixed gear ratios in hill braking as well as a choice of infinite range in automatic drive or four fixed ratios in forward drive; provision for pushpull start or towing in which a comparatively low speed of the vehicle suffices for a push or pull start; a throttle-actuated step-down from top gear to third gear for rapid acceleration; an automatic brake which is inescapably applied no matter what the position of the controls when the engine stops, thus removing the necessity of having a special parking setting for the controls; free wheeling if desired; the elimination of any fluid drive or torque converter; a top gear in which a direct one-to-one drive is obtained without slip; the safety feature of preventing accidental starting of the vehicle in gear; two brakes being used for low forward drive, one of which may also be used to take the place of the conventional hand brake; two gear ratios in reverse; an automatic functioning of the transmission when desired giving an infinite gear ratio in either forward or reverse drive; a brake automatically applied when the gear control is placed in neutral and sufficient to hold the vehicle even on steep grades at an intersection; simple controls not subject to seizure or mechanical failure and not dependent on opposing fluid pressures for their operation; the use of only one pressure pump with simplified conduits for operating the controls; and provision for releasing the major portion of pressure from the pressure pump in top gear thus reducing drag on the drive shaft.

These and other features, objects and advantages will be apparent from the annexed specification in which:

Figure 1 is a vertical section through a power transmission embodying the present invention, Figure 2 is a section taken along the line 2—2 of Figure 1, Figure 3 is a section taken along the line 3—3 of Figure 1, Figure 4 is a view partly in section of one of the control mechanisms, Figure 5 is a fragmentary view partly in section of the front brake control assembly, Figure 6 is a view partly in section of the rear brake control mechanism, Figure 7 is a diagrammatic view of the hand control mechanism, Figure 8 is a fragmentary view partly in section of one of the control mechanisms illustrating the pressure release for the resistance pump, Figure 9 is a fragmentary section illustrating alternative reverse mechanism, Figure 10 is a view partly in section illustrating one form of control mechanism, Figure 11 is a diagrammatic view showing the condition of the various elements in the various settings of the hand control, Figure 12 is a plan view of a section of the piston used in the rotary valve of the control mechanism, Figure 13 is a section taken along the line 13—13 of Figure 12, Figure 14 is a section taken along the line 14—14 of Figure 12, and Figure 15 is a fragmentary section illustrating alternative reverse and low gear mechanism.

Referring now more particularly to the drawings and particularly to Figure 1, the power transmission of this invention is shown as including a drive shaft 20 which, it will be understood, receives torque from the engine. A cross wall 21 forming a part of the gear box wall is provided, the shaft 20 extending through a bore 22 in said cross wall and being provided with a re-entrant bore 23 adapted to receive the reduced end of the shaft 24. The shaft 20 is provided with an enlarged end or flange 25 to which there is secured, as by means of the studs 26, a casing 27 which houses a split shaft mechanism hereinafter described.

The shaft 20 is also provided with a gear 30 which is housed in a housing 31 secured to the cross wall 21 by means of the studs 32. The housing 31 also contains a gear 33 mounted upon a hub 34 carried by and forming a part of the cross wall 21. A trough 35 may be bolted to the other side of the cross wall 21, as shown, and the cross wall is apertured at 36 to communicate oil contained in the trough 35 to the gears. The housing 31 is apertured as at 37 and a conduit 38 is in communication therewith to receive oil pumped by the gears 30 and 33. The assembly just described is the operating pressure pump for the purposes hereinafter described.

The shaft 24 is provided in the region of the casing 27 with a pair of lateral extensions or protuberances 40 and 41 and, similarly, the casing 27 is provided with a complementary pair of inwardly extending members 42 and 43. The shaft 24 is provided with a lateral bore 44 and a longitudinally extending bore 45. The casing 27 is provided with a pair of openings 46 and 47 and the protuberances 40 and 41, 42 and 43, are so designed as to leave a slot 48 between them.

Coil springs 49 and 50 are mounted within the casing 27, each having one end abutting a protuberance on the shaft 24 and the other end abutting a protuberance on the casing 27, as shown in Figure 2.

The assembly just described constitutes a torque responsive valve.

Oil supplied to the longitudinal bore 45 in the shaft 24 is communicated thereby to the lateral bore 44 and thence to the slot 48. Torque applied to the casing 27 will tend to rotate the casing 27 upon the shaft 24 and the extensions 40 and 41 so as to compress the springs 49 and 50, thus increasing the width of the slots 48, and thus permitting a greater rate of oil escape through said slots in response to increased torque applied by the drive shaft. Upon a decrease of torque thus applied, the slots 48 will be narrowed under the influence of the coil springs 49 and 50.

The shaft 24 is also provided with a lateral bore 51 communicating with an annular groove 52 formed upon the periphery thereof. A ring 53 having a complementary groove 54 is carried by the shaft 24 and a conduit 55 communicates with a passage formed by the complementary grooves 52 and 54. A similar annular groove 56 is formed upon the shaft 24 and a similar complementary groove 57 is formed within the ring 53, and the shaft 24 is provided with a lateral bore 58 communicating with the passage thus formed. A conduit 59 is provided in communication with this last mentioned passage.

The shaft 24 is likewise provided with an eccentric longitudinal bore 60 communicating with the lateral bore 58 and with a further lateral bore 61, as shown in Figure 1. The shaft 24 is provided with an annular groove 62 communicating with the lateral bore 61. The shaft 24 is further provided with a lateral bore 63 and an annular groove 64, the lateral bore 63 thus communicating the central bore 45 to the groove 64, as shown in Figure 1. The shaft 24 is provided with a reduced end 65 received within a re-entrant bore 66 formed in the central shaft 67.

The shaft 24 is provided with a collar 68 which is splined for mating with splines 69 formed in the enlarged end of the tubular extension 71 of the clutch cross wall 72.

The numeral 74 indicates generally a housing. Integral with the housing 74 is the clutch cross wall 72, the front wall 75, and the rear wall 76.

The front wall 75 is bored out as at 77 to form a cylinder and is provided with a lateral bore 78 communicating the annular groove 62 with the cylinder 77.

In practice, the device will be provided with six similar cylinders 77 and six lateral bores 78, two of which are shown in the section depicted in Figure 1. The cylinders 77 are provided with pistons 80. The pistons 80 are hollow and are provided with piston shafts 81 affixed to the interior of the pistons and extending through bores 82 in the front wall 75. The outer ends of the piston shafts 81 are enlarged to form collars 83. The wall 75 is provided with bleed holes or bores 84 for bleeding each of the cylinders 77. A sleeve 86 is provided on the shaft 24 having an enlarged collar 87. A coil spring 88 is provided on the shaft 24 between sleeve 86 and the recessed portion 89 of the front wall 75. The front wall 75 carries six brackets 90, each mounting a pivoted lever arm 91 having one end engaging the collar 87 and the other end engaging one of the collars 83. The end of the lever arm 91 engaging the collar 87 is appreciably longer than the end thereof engaging the collars 83, and thus provides considerable mechanical advantage.

A yoke 92 is provided engaging the collar 87 and suitably pivoted on a cross shaft 93 for moving the sleeve 86 longitudinally of the shaft 24 and thus pivoting the lever arms 91 to withdraw the pistons 80 to their full forward position to disengage the clutches hereinafter described.

The pistons 80 are reduced in diameter throughout the major portion of their length and the reduced portion is adapted to be received within a bore 94 in the clutch cross wall 72. The piston head 95 is adapted to engage a plate 96 forming a portion of the clutch. The plate 96 is annular in form and is correspondingly engaged by each of the pistons 80. The plate 96 is externally splined and movably mounted in slots formed in a ring 97. The ring 97 similarly carries a plurality of movably mounted clutch plates 98. A fixed rear wall 99, having a circular opening 100 therein is provided to complete the clutch. The rear wall 99 is preferably formed integral with the housing 74, as shown. The central shaft 67 is provided with an enlarged head 101 and a tubular extension 102 is provided thereon. A ring 103 is mounted upon tubular extension 102 and it movably receives the inner clutch plates 104.

From the foregoing description, it will be apparent that fluid under pressure supplied by the conduit 59, the longitudinal bore 60, the lateral bore 61, and the bore 78 will be communicated to the cylinders 77, thus tending to force the pistons 80 to the limit of their forward movement. Coil springs 105 are provided on each of the piston shafts 81, having one end abutting the front wall 75 and the other end abutting the piston heads 95, and thus the clutch mechanism is spring applied and hydraulically disengaged by the above described mechanism.

The enlarged head 101 of the central shaft 67 is provided with an annular groove 107 cooperating with the annular groove 64, and three bores 108, only one of which is shown in Figure 1, communicate the passage formed by the grooves 64 and 107 to the outlets of a gear pump hereinafter described.

The shaft 67 in the region of the enlarged head 101 is also provided with a collar 109 formed integrally therewith and constituting both a front pump wall and a planet carrier. The collar 109 is provided with three bosses 110 constituting the bearings for a corresponding number of planet gears 111, and a rear pump wall 112 is provided, preferably secured to the bosses 110 by means of studs 113. The rear wall 112 is apertured as at 114 for receiving the shaft 115 carrying the sun gear 116. The shaft 115 is hollow and revolves about the central shaft 67, as shown. An annulus gear 117 is provided on the inner side of the housing 74 cooperating with the planets 111.

A sump is provided constituting the rear wall 76 and an interior wall 118, which sump assures that oil maintained therein by means of maintaining the oil level within the transmission at a suitable height indicated at 119, will be fed to the gears 111 and forced thereby into the outlet passage 108. The revolution of the housing 74 will cause the oil in the sump to be forced by centrifugal action to the planet gears 111 peripherally, thus assuring the constant supply of oil to the pump formed by the planet gears and sun gears. The lower portion of the housing which contains the transmission is suitably formed to act as a reservoir 602 for the oil and from this sump oil is admitted to the front pressure pump and to the inlet of the front planetary pump.

It will be apparent that maintaining the oil at such a suitable level (indicated at 119), will also assure a constant filling of the trough 35.

The shaft 115 is provided with an integrally formed plate 120 having a flange 121 forming a brake drum. A shoe 122 provided with a suitable lining 123 is provided for engaging the brake drum. The central shaft 67 is provided with a re-entrant bore 124 for receiving the front end of the driven shaft 125. The central shaft 67 is also provided with a longitudinal bore 126, a lateral bore 127 communicating therewith, and an annular recess 128. A ring 129 is provided on the shaft 67 and has a complementary annular recess 130. A conduit 131 communicates with the passage formed by the recesses 128 and 130 and the shaft 67 in its enlarged portion 132 is provided with a plurality of lateral bores 133 communicating with the longitudinal bore 126.

The enlarged portion 132 forms a front wall 134 and a central clutch wall 135. The front wall 134 is provided with a plurality of bleeding holes 137 corresponding in number to the six pistons and cylinders hereinafter described. The clutch housing also includes a side wall 138 secured to the front wall as by means of the studs 139 and a rear wall 136 is formed integrally with the side wall 138. The structure of the side and end walls in lieu of being as described, can be the same as the structure of the housing 74 above described.

The central clutch wall 135 is apertured as at 140 to receive the reduced end of a piston 141. As before, preferably six of the pistons 141 are provided. The pistons 141 are hollow and contain a coil spring 142. The piston heads 143 engage the heavy movable plate 144 of the clutch under the bias of the springs 142. Outer clutch plates 145 are again splined in ring 146 and inner clutch plates 147 are splined in ring 148, which ring 148 is mounted on a recessed portion of the tubular extension 149 of the annulus bearing member 150.

It will be apparent from the above described mechanism that the clutch just described is applied by the pressure of the spring 142 and is disengaged by fluid pressure supplied by the conduit 131, the lateral passage 133 to the cylinders 151.

The shaft 67 is provided with an annular groove 152 which serves to maintain communication between the passages 133 and the passage 126.

The shaft 67 has a reduced portion 155 on which is seated the ring-like portion 156 of the annulus bearing member 150. The central shaft 67 is also provided at its rearmost portion with a sun gear 157. The annulus bearing member 150 has formed integrally therewith an outer side casing 158 which carries the annulus gear 159 and also integral with the annulus bearing carrier 150 is the rear plate 160 which has a bearing portion 161 seated upon the driven shaft 125, as shown. A brake 162 having a lining 163 is provided for braking the annulus and outer casing 158. Mounted upon a plate 164 formed integrally with the driven shaft 125 are hubs 165 mounting planet gears 166 which mesh with the sun 157 as well as the annular gear 159. Preferably, the planet gears 166 will be three in number.

The plate 160 has a hub-like extension and formed integrally therewith is a sun gear 167 which has a bearing portion 168 riding upon the driven shaft 125. The shaft 125 has a plate-like portion 169 formed integral therewith and having hubs 170 upon which are mounted a plurality of planet gears 171. Preferably, there will be three such hubs and planet gears.

Mounted upon the driven shaft 125 is a bearing 172 having a plate-like extension 173 which, itself, is provided with a flange 174 upon the interior of which is formed an annulus gear 175 and on the exterior of which is formed a rack-like portion 176 adapted to be engaged by a sprag 177 to brake the annular gear. The annulus 175 meshes with the planet gears 171 which in turn mesh with the sun gear 167.

Referring now more particularly to Figure 15, there is shown an alternative embodiment of the mechanism last described. In this the driven shaft 125b is provided with a plate-like extension 164b which replaces the extensions 164 and 169 in Figure 1. This extension is provided with a plurality of studs 165b extending forwardly to mount a first series of planet gears 166b and a set of studs 170b which carry a second series of planet gears 171b which mesh internally with the first series of planets 166b, and externally with a reverse annulus gear 174b. The central shaft 67b carries a ring 149b with splines for the inner plates 147b of the rear clutch. At its rear end shaft 67b has a driving sun 157b which drives the first series of planets 166b. A brake drum 158b is internally splined to carry the outer clutch plates 145b and a brake 162b acts to hold drum 158b. A plate 160b is integral with drum 158b and is supported centrally on shaft 67b by a bearing hub 158b which also carries a reaction sun gear 167b meshing with the second series of planet gears 171b. Preferably there are three planets in each of the said series. A brake 180 serves to hold the reverse annulus gear 174b stationary. A bearing member 600 is provided upon the shaft 125b and carries a plate 601 which mounts the annulus 174b.

Referring now more particularly to Figure 9, there is shown an alternative embodiment of the mechanism last described in which the annulus bearing member 150a is provided on the interior of its flange 158a with an annulus gear 159a. The sun gear 157a has a hub-like extension 188 on which is formed a second sun gear 167a. The bearing 172a has a plate 173a and a flange 174a on the interior of which there is formed an annulus gear 175a. The driven shaft 125a has a plate-like portion 169a upon which there is mounted preferably integrally therewith studs 190 which are extended to mount the planet gears 166a as well as the planet gears 171a. The studs are preferably three in number and mounting a corresponding number of planet gears 166a and 171a. The planet gears 166a mesh with the annulus gear 159a and the sun 157a. The plate 169a is provided with a plurality of studs 191, each mounting a planet gear 192. The studs and planet gears 191 and 192 are again preferably three in number.

The planet gears 171a mesh with the annulus gear 175a and with the planet gears 192. The planet gears 192, in turn, mesh with the sun gear 167a. A brake 162 is provided for braking the annular gear 159a and a brake 177a is provided for braking the annulus 175a.

The operation of the above described device is as follows:

Assuming torque is applied to the drive shaft 20, this torque will be applied through the casing 27, springs 49, to the shaft 24. The torque thus applied to the shaft 24 is communicated through the splines 69 to the housing 74 which thus rotates as a unit with the shaft 24. Assuming the front clutch comprising the plates 96, 98 and 104 is engaged under the force of the coil springs 105, the central shaft 67 will be rotated as a unit with the housing 74 and the shaft 24. Torque thus applied is transferred by the central shaft 67 to the front wall 134, side wall 138 and central clutch wall 135. If the clutch formed by the plates 144, 145 and 147 is engaged under the force of the coil springs 142, the torque thus applied will be transferred to the annulus bearing member 150. As the sun 157 is integral with the wall 135, it also is rotating at the same angular velocity as the annulus bearing member 150; thus the planets 166 are locked between the annular gear 159 and the sun 157, and the plate 164 rotates with the annulus bearing member 150 and the sun 157, thus driving the driven shaft at a direct 1:1 ratio.

Assuming that both of the clutches above described are disengaged, which is accomplished by applying fluid pressure to the conduits 59 and 131 through controls hereinafter described, a low or first gear is achieved. In this case, the torque is applied from the shaft 24 to housing 74. As the annulus gear 117 is thus rotated, the planet gears 111 are worked. Through controls hereinafter described, the brake 122 is applied, thus locking the sun gear 116. This causes the planet gears 111 to travel forwardly about the sun 116 and thus transfers the torque to the planet carrier 109 and thence to the central shaft 67. The central shaft 67 is, however, driven at a rate which is at a ratio of 1.5:1, the rate of the shaft 24, due to the constants of the annulus gear and planet gears.

The torque thus applied to the central shaft 67 is again transferred to the wall 134, the wall 135 and the wall 138 which, together, form the housing of the second clutch. The second or rear clutch formed by the plates 144, 145 and 147, is in this condition disengaged and hence the torque is transmitted to the sun gear 157. The brake 162 is in this condition applied through controls hereinafter described, thus braking the annulus 159. In this condition, the planet gears 166 are worked, thus driving the planet carrier 164 forwardly, but again at a reduced rate of approximately 2.5:1, with respect to the rotation of the central shaft 67. As the planet carrier 164 is integral with the driven shaft 125, a combined ratio of approximately 3.75 is obtained.

From the foregoing description, it will be apparent that if the front clutch is engaged, the front unit will be bound together, thus eliminating the 1.5:1 mechanical advantage obtained through working the front planetary gearset, and if the rear clutch is disengaged, a gear ratio of 2.5:1 is obtained. This condition approximates a conventional second gear.

It will be likewise apparent that if the rear clutch is engaged and the front clutch disengaged, the rear unit will be bound together, thus eliminating the 2.5:1 advantage obtained therein and leaving only the 1.5:1 advantage obtained in the front unit, a condition which approximates a third gear with a 1.5:1 gear ratio.

As hereinabove described, the engagement of both clutches conditions the entire device for rotation as a unit with a direct 1:1 ratio.

A fully automatic operation with variable gear ratio can also be achieved by the above described device. In this condition, the rear clutch formed by the plates 144, 145 and 147 is engaged, the front clutch is disengaged and the brake 122 is disengaged. The torque will thus be applied from the shaft 24 through the housing 74 to the annulus gear 117. This will tend to drive the planet gears 111 forwardly and the sun gear 116 backwardly. In this condition, the pump formed by the sun gear and planet gears pumps oil into the passages 108 and out through the conduit 55 and through the slot 48.

The conduit 55 is shown for use in connection with a set of controls yet to be described. If the control is desired to be achieved through the torque responsive valve comprising the housing 27 and associated mechanism, the conduit 55 may preferably be closed at the port 296. In this condition, the escape of oil from the passage 45 is entirely dependent upon the opening of the slot 48, due to the relative movement of the housing 27 and the shaft 24. As this relative movement is dependent upon the torque applied and the amount of compression of the springs 49, increased torque will cause a wider escape to be presented for the oil and therefore less resistance to the pumping of the gears. In this condition, the engine is permitted to turn at a much greater rate than is the planet carrier 109 driven forwardly, the ratio being entirely dependent upon the relative torque applied. If the resistance is increased by a decrease in the opening 48, the pumping of the gears will be rendered more difficult, in which condition the planet carrier will travel forward at a gradually increasing speed until it approaches a condition wherein the pump action is reduced to a minimum. In this condition, the planet carrier is driven forward at a rate approximating a third gear ratio or higher. The driving of the planet carrier, as above described passes torque to the driven shaft through the rear unit which is locked together as a unit by the rear clutch.

Reverse gear is obtained with the device shown in Figure 1 by using the sprag 177. The locking of the sprag through controls to be herein described brakes the annulus 175. Torque then applied through the central shaft 67 is transferred from the sun gear 157 through the planet gears 165 to the annulus gear 159, the plate 160, to the sun gear 167 which drives the planets 171. As the annulus gear 175 is held by the sprag, the planet carrier 169 which is integral with the driven shaft 125 is caused to be driven backwards. This reverse drive is obtainable in any condition of the mechanism described in which the brake 162 is not applied and the rear clutch is disengaged, thus affording a reverse in which there are obtainable two fixed gear ratios depending upon the operation of the brake 122 and the front clutch. An infinite reverse gear ratio is also provided by disengaging both the front clutch and the brake 122 and thus causing the oil pump to turn.

Referring now to the device shown in Figure 9, the operation of the device is in all respects similar to the operation of the device shown in Figure 1, with the exception of reverse. In this case, reverse is obtained by applying the brake 177a the rear clutch being disengaged and the brake 162 disengaged. This brakes the annulus gear 175a and drive is imparted through the sun gear 167a, which is integral with the central shaft 67, to the planet gears 192, thence to the planet gears 171a to the planet carrier 169a. As the annulus gear 175a is held, the planet carrier 169a is driven backwards and hence reverse rotation is imparted to the driven shaft 125a.

In order that the driver will have immediately under his control mechanism for establishing the various conditions above described, there is provided a control mechanism shown in Figure 10. This control mechanism includes a control cylinder 200, which cylinder contains a piston 201 having a piston shaft 202 on which is mounted beveled gear 203. A second beveled gear 204 is provided meshing with the gear 203 and having a shaft 205. The shaft 205 is provided with an operating handle 206 and an indicator 207 preferably disposed adjacent the steering wheel of the vehicle. The indicator 207 is provided to indicate the condition of the controls and is provided with a dial 208 provided with indicia adapted to indicate the conditions of reverse, neutral, automatic drive, first, second and third, and 1:1 ratio and brake. (See Figure 7.)

Figure 12 illustrates a portion of the piston 201. The piston is provided with a plurality of recesses 209 upon one side of a slot 210 and a corresponding number of recesses 211 upon the other side of the slot, but spaced so as to provide alternately a recess 209, a solid portion 212, respectively aligned with a solid portion 213 and a recess 211, as shown in Figure 12. The cylinder 200 is provided with a plurality of openings 214, each of which is joined by a conduit 215 to a header 216 which communicates with the conduit 38 leading to the outlet of the pressure pump. The cylinder 200 is likewise provided with a plurality of openings 218 which drain to the oil sump. It will be apparent from the above description that a suitable turning of the piston 201 will dispose one of the solid portions 212 or 213 so as to cover the openings 214 or 218, or, alternatively, to uncover such openings by means of a recess 209 or 211. The cylinder 200 is provided with a plurality of openings 219 which are in communication with conduits 220, 221, 222, 223 and 224. Thus, the passage of oil from the conduit 38 to any of the conduits 220 to 224, inclusive, can be regulated by the control handle 206 and similarly any of these lines can, when desired, be drained.

A cylinder 228 is provided having a piston 229 disposed therein with a coil spring 230 interposed between one end of the piston and the end of the cylinder 228 and a coil spring 231 disposed between the other end of said piston and the other end of the cylinder. The piston 229 is provided with a piston shaft 232 having a collar 233 therein adapted to be engaged by a yoke 234. The piston shaft 232 is also provided with a second collar 235 and a coil spring 236 may be disposed upon the shaft 232, as shown. The spring and collar 236 and 235 are also adapted to be engaged by the yoke 234 for retraction of the piston 229.

The cylinder 228 is provided with an opening 237 to which is attached the conduit 220, an opening 238 to which is attached the conduit 221 and an opening 239 to which is attached the conduit 222. The piston 229 is provided with three annular slots 240, 241 and 242 disposed as shown in Figure 10. The cylinder 228 is also provided with openings 243, 244, 245, 246, 247 and 248. Openings 246, 247 and 248 are drain openings, whereas openings 243, 244 and 245 have conduits, each indicated by the numeral 260 and each communicating by a header and conduit not shown, to the conduit 38. The drain openings may also be provided for drainage to the oil sump.

The cylinder 228 is also provided with openings 249, 250 and 251 of greater lateral extent than the slots 240 to 242 and communicating, respectively, with conduits 252, 253 and 254. From the mechanism above described, it will be apparent that upon moving of the piston to the right or left within the cylinder 228, communication can be established from the conduit 220 to the conduit 252 or, alternatively, the conduit 220 can be closed off, and one of the conduits 260 opened to apply fluid pressure to the conduit 252.

In the event the piston 229 is moved to the left, conduit 221 will be closed, conduit 260 opened, and oil under pressure applied to the line 253. In the event the piston is moved to the right, conduits 260 and 221 will be closed and the drain 246 opened.

In the event of the movement of the piston to either right or left, conduit 222 will be closed and one or the other of the drains 247 and 248 opened, thus draining the line 254. The yoke 234 is operated by a shaft 261 controlled by the throttle pedal of the engine in such a manner that clockwise rotation of the yoke corresponding to an opening of the throttle, and counterclockwise rotation corresponding to a closing of the throttle. The above described mechanism provides for a free wheeling effect when the throttle is closed, and an automatic shifting from high to third gear on a sudden full opening of the throttle, as hereinafter described.

A cylinder 264 is provided having openings 265, 266 and 267. The conduit 253 is attached to the opening 265 and the conduit 254 is attached to the opening 266, whereas the conduit 223 is attached directly to the opening 267, as shown.

The cylinder 264 is also provided upon the other side with enlarged openings 268, 269 and 270. A conduit 271 is attached to the opening 268, the conduit 272 to the opening 269, and a conduit 273 to the opening 270.

A piston 274 is provided in a cylinder 264 which piston is provided with annular slots 275, 276 and 277, as shown. The piston carries a piston shaft 278 which passes through an end opening 279 and carries thereon a coil spring 280 interposed between the right end of the cylinder and the right end of the piston, as shown. A bleed hole 281 may be provided in the left end of the cylinder. The shaft 278 is provided with a collar 282 and a coil spring 283. A yoke 284 is pivotally mounted on a shaft 285, connected to and operated by a hand brake, 610, adapted to engage the spring 283 and collar 282 and move the piston 274 to the right, thus closing communication between the conduits 253 and 271, between conduits 254 and 272, and conduits 223 and 273, and at the same time draining the conduits 271, 272 and 273 through drain openings 286, 287, and 288.

A cylinder 290 may be provided having openings 291 and 292 on one side and drain openings 293 and 294 on the other side. A conduit 295 is provided having one end communicating with a drain opening 296 in the cylinder 200 and the other end communicating with the opening 292. The conduit 295 is provided with a branch 297 leading to needle valve 298 and thence through conduit 299 to the opening 291. A piston 300 is provided within the cylinder 290 having reduced portions, as shown at 301 and 302. The piston 300 carries a piston shaft 303 mounted for sliding movement, as at 304. A slide shaft 305 suitably mounted as at 306 and 307 is provided connected to the accelerator or throttle pedal of the vehicle.

The driven shaft 125 is provided with a conventional centrifugal mechanism 606, working only in forward drive and not acting when the toilshaft is reversing, to which, is operably attached a shaft 308 mounted for sliding movement as at 309 in response to movement of the centrifugal mechanism in such manner that the shaft 308 moves to the left on increased revolution of the driven shaft 125, and to the right on decreased revolution of the shaft 125. A link 310 is pivotally mounted on the shaft 305 as at 311 and intermediate the ends thereof is provided with an enlarged portion 312 having a slot 313 therein adapted to receive a pin 314 carried by the shaft 303. Toward its lower end, the link 310 is provided with a second enlarged portion 315 having a slot 316 therein adapted to receive a pin 317 carried by the shaft 308.

Assuming that the conduit 295 is in communication with oil to be drained from conduit 222, the oil under pressure will pass through the opening 292 into the cylinder 290 and alternatively to the conduit 297, needle valve 298, conduit 299, and opening 291 into the cylinder 290, so that oil will be released through the drain openings 293 and 294 at a rate dependent upon the position of the piston 300. The position of piston 300 is in turn dependent upon the relative positioning of the shafts 305 and 308. Conduit 272 is connected to the conduit 55 which is an outlet for the planetary gear pump. With the hand brake off and shaft 285 rotated clockwise, valve 274 is moved to the left and conduit 272 is open to conduit 254. With throttle-connected arm 234 intermediate of its full open and fully closed positions, valve 229 is centered and conduit 254 open to conduit 222, and, with rotary valve 201 in position for "automatic" drive, conduit 222 is open through port 296 to conduit 295. The flow through conduit 55 then depends on the openings at ports 293 and 294.

Shaft 305 is mounted so as to move to the right (Figure 10) upon closing of the throttle 605, whereas shaft 308 moves to the left upon increased turning of the driven shaft 125. Thus a closing of the throttle tends to move the piston 300 to the left and an increased turning of the driven shaft also tends to move the shaft 308 to the left. The gear ratio of the transmission when in automatic drive is decreased upon an increase, as hereinafter described, to the resistance to the passage of oil from the conduit 222. As a movement of the piston 300 to the left tends to close the openings 293 and 294 and increase the resistance to the escape of such oil, it follows that a movement of the piston 300 to the left decreases the gear ratio and places the transmission in higher gear. It will be apparent that such change in gear ratio is automatically accomplished, either upon a closing of the throttle, or an increased speed of the vehicle, and vice versa. At lower speeds the operator may sometimes find that the hydraulic control thus described is rough in operation, tending too suddenly to apply resistance to the resistance pump. A fine adjustment may, however, be made by the needle valve 298 to overcome this defect. The needle valve 298 may be suitably placed within reach of the operator of the vehicle or service men for making this fine adjustment.

The operation of the above described device is as follows:

The conduit 252 is attached to the conduit 59 provided for the application of oil under pressure from the pump to the front clutch. The conduit 271 is provided for the operation of the hydraulic cylinder hereinafter described operating the front brake 122. The conduit 272 is in communication with the conduit 55 and thus controls the escape of fluid under pressure from the pump formed by the front planetary gearset. The conduit 273 is in communication with the conduit 131 and thus controls the application of the rear clutch. The conduit 224 is provided for the supply of oil under pressure to the hydraulic mechanism for controlling the rear brake 162 as hereinafter described.

Referring now to Figure 11, there is shown a box illustrating the condition of the transmission in the various settings of the control 206. When the engine is shut off, the condition referred to as "dead engine," no pressure will be built up by the front pump and communicated to the line 38. As the front clutch is released by pressure supplied from the line 38 through the cylinder 200, the conduit 220 and the conduit 252 communicating with the conduit 59, the front clutch will be engaged under the force of the coil springs 105. The front brake will be off, being hydraulically applied as hereinafter described, dependent upon oil under pressure from the conduit 38, cylinder 200, conduit 221 and conduit 271. The resistance pump formed by the front planetary gearset will be idle. The rear clutch being spring applied by the coil springs 142 and released upon the application of oil under pressure through the conduits 131, 273, 223 and cylinder 200, and conduit 38, will be engaged. The rear brake being, as hereinafter described, spring applied and hydraulically released under the force of oil under pressure supplied by the conduit 224, cylinder 200 and conduit 38 will be engaged.

In this condition, therefore, both of the clutches are engaged and the main brake is on. It will be apparent that the engine cannot be started in this condition as the transmission is locked to both the drive and driven shafts and a brake is applied. This presents a safety factor assuring that the engine cannot accidentally be started by careless persons or children.

In order to start the engine, the operator must first apply a hand brake. The hand brake is shown in Figure 6 where there is illustrated the hydraulic mechanism for releasing the main brake and the associated mechanism.

The hand brake operates a rod 320 which is slidably mounted as at 321 and has pivoted thereto a link 322. One end of the link 322 has a cam 323 adapted to engage the brake post 324 formed on the brake shoe 162. The other end of the link 322 is pivoted to a link 325 which is itself pivoted to a link 326, which link 326 is fixedly connected to the cross shaft 93 which carries the yoke 92. Thus a movement of the rod 320 to the left (Figure 6) will engage the yoke 92 with the collar 87 of the sleeve 86 which, in turn, will pivot the lever arms 91 so as to retract the pistons 80 and disengage the front clutch. At the same time, if conditions are appropriate, the brake 162 will remain engaged, due to the action of the cam 323.

A shaft 327 is provided carrying a cam 328 adapted to engage the other side of the post 324 and prevent engagement of the brake 162. Shaft 327 is operatively connected by means not shown to a push-tow button 329, preferably located on the dashboard in a position for convenient access of the operator. Alternatively, the cam 388 may be actuated through suitable connections 604 by a handle 604A, Figure 6. The push-tow button is engaged to force the cam 388 against the post 324, as shown in Figure 6, in either towing or in push or tow start. In towing, the engine, of course, dead and the conditions the same as above described with respect to dead engine, but the hand brake is engaged to move the shaft 320 to the left and disengage the front clutch, as above described, and at the same time, the push-tow button is engaged to engage the cam 328 with the post 324 to disengage the brake 162. Preferably, the push-tow button is actuated prior to the putting on of the hand brake.

In either push or pull start, the conditions will be the same as for towing, with the exception that the hand brake will not be applied so that the yoke 92 will not be engaged with the collar 87 to disengage the front clutch and thus the engine will be turned over by the forward movement of the vehicle.

The condition of the mechanism in automatic drive has been described above, as well as the condition in reverse. In neutral, the front clutch is off; the front brake is off; the resistance pump outlet, the conduit 222, being open to the drain 218; the rear clutch is engaged and the rear brake is on. The hand brake is initially on for the starting above described, but is then taken off.

For hill braking with this transmission, two types are provided: the fixed gear ratios, any one of the four gears is available for turning the engine to provide braking; however a second type of hill braking, depending on the resistance pump is afforded with the handle 206 turned into the portion marked "brake" in Figure 7. In this condition, the engine is not relied upon for the brake effect, but rather the resistance afforded to the resistance pump. In other words, the front clutch is disengaged and varied resistance applied to the output of the resistance pump by regulating the amount of opening provided at 218.

Further, two conditions of this pump braking are possible, one in which the rear planetary is bound as a unit by engaging the rear clutch in which the driven shaft 125 and the central shaft 67 will revolve as a unit, and in the other of which the rear planetary is working, the clutch being disengaged, the rear brake 162 is engaged, thus giving a 2.5:1 ratio of drive between the driven shaft 125 and the central shaft 67. In any condition of pump braking, the brake 122 is applied. It will be seen that the resistance pump functions as a clutch but the progressive clutching action embraces all the members of the planetary assembly including any other members in direct connection with the said assembly. The member connected with the driven shaft is not only clutched to the member connected with the drive shaft but is also clutched to the said third member which is provided with associated braking means. If the said braking means is engaged and the third member held stationary thereby, then the said driven shaft will also be braked to a degree in accordance with the degree of fluid clutching which is present. If the flow from the pump is completely unrestricted and provided with a wide-open escape then the driven shaft will turn the engine as a brake in the reduced ratio which is provided by the planetary assembly.

When the pump is completely closed, locking of the gears forming the pump becomes practically complete and the engine, the drive shaft, the planetary assembly and the driven shaft are all locked together.

The above feature is not one of engine-braking and if disconnecting means such as a fluid clutch were installed, between the drive shaft and the engine, the gear-locking described would still be operative. When the operator of the vehicle applies the said braking means and then restricts the said out-flow, he variably restrains the rotation of the gears forming the said pump and variably restrains, at the same time, the rotation of the said driven shaft.

A free wheeling effect, as well as a kickdown into a lower gear is also achieved by this invention. For free wheeling, by means of the device shown in Figure 10, the throttle is released, the yoke 234 is pivoted in a counter-clockwise direction engaging the spring 236 and the collar 235, and moving the piston 229 to the right, thus opening the drain openings 246 and 248. This results in a draining of the conduits 271 and 272 so that very little resistance is offered to the resistance pump and the front brake is disengaged. At the same time, the opening 244 is opened, applying power to the conduit 252 and consequently disengaging the front clutch, thus freeing the engine.

For a kickdown, a rapid change from top to third gear for quick acceleration, the throttle is quickly depressed beyond its normal full open position, thus pivoting the yoke 234 in a clockwise direction and moving the piston 229 to the left. In this condition, the front clutch is disengaged by power applied through the opening 243, the front brake is applied by power supplied through the opening 245, the resistance pump is drained through the opening 247. As the top gear requirements differ from the third gear requirements only in the disengagement of the front clutch, and the engagement of the front brake and as these requirements have been met by a proper positioning of the piston 201, the device is thus shifted from top to third gear from which it will return to top gear immediately upon release of the throttle from the extreme position.

As stated hereinabove, the front brake is put on by applying oil under pressure through the conduit 271. Referring now more particularly to Figure 5, a preferred embodiment of this construction is shown including the brake shoe 122, a post 332 to which is affixed by adjustable nuts 333 a piston shaft 334. A cylinder 335 is provided housing the piston 336 to which the shaft 334 is pivotally connected. A coil spring 337 is provided between the piston head and the open end 338 of the cylinder. The piston seats upon a shoulder 339 formed in the cylinder and is provided with an annular groove 340 and a fluid passage 341 communicating the cylinder head 342 with the annular groove. The conduit 271 has two branches 343 and 344 connecting with openings 345 and 346 in the cylinder, as shown. A check valve 347 is provided in the conduit 344. A spring 337 tends normally to keep the brake 122 disengaged. Power applied through the conduit 271 cannot pass the check valve 347 but must pass through the conduit 343 and the passage 341 into the cylinder head. When the fluid is initially applied, the opening 345 is fully opened, but as the piston 336 moves to the left, the piston head progressively closes the opening 345 until only a narrow passage is left. This assures that the brake will not be too rapidly applied or "grabbed." Practically instantaneous disengagement of the brake is achieved, however, as the check valve 347 permits fluid to flow outwardly from the conduit 271 almost instantly, regardless of the position of the piston.

Referring now more particularly to Figure 3, the application of the sprag to the rack 176 is shown. To accomplish this, the sprag 177 is pivotally mounted on a shaft 348 to which is rigidly connected a link 349. The link 349 is pivoted to the end of a piston shaft 350. A cylinder 351 is provided housing the piston 352 and a coil spring 353, as shown. Fluid is admitted into the cylinder head by a conduit. The conduit 354 is shown in Figure 10 as controlled by the drain opening 355 in cylinder 200 and the power opening 356 to which is connected the header 216. Thus the sprag 177 is operated by a proper setting of the piston 201 by means of the handle 206.

Referring now more particularly to Figure 6, mechanism for the application of the brake 162 is shown. A cylinder 358 is provided housing a piston 359, the movement of which to the right is restricted by a shoulder 360 formed within the cylinder. The piston 359 is provided with a centrally disposed annular groove 361, a piston shaft 362. The shaft 362 is mounted for sliding movement as at 364 and is positioned relative to the post 324 by the adjustable nuts 365. The conduit 224 is provided with two branches 366 and 367. The branch 366 is provided with a check valve 368 and the branch 367 is provided with a needle valve 369. The two branches 366 and 367 meet and are joined to the cylinder 358 at the opening 370 therein. A coil spring 371 is provided between the right end of the piston and the right end of the cylinder. From the foregoing, it will be apparent that the coil spring 371 tends to keep the brake 162 constantly applied, provided that hydraulic pressure is not present in the piston head and the cam 328, which is controlled by manual control 604, is disengaged.

In 1:1 drive, the two clutches are both engaged by springs thus fluid pressure for disengaging these clutches is not necessary. The only fluid pressure from the gear pump 30 which is required is that which is necessary to disengage the rear brake 162. In order to permit a great reduction in the pressure applied by the gear pump 30 in direct drive and still disengage the rear brake 162, a cylinder 376 is provided. This cylinder houses a piston 377 having an annular groove 378 therein. An opening 379 is provided in the cylinder and an elbow 380 is in communication therewith and provided with a pressure release valve 381. An opening 382 is provided in the cylinder to which is attached a conduit 383. The opening is in alignment with the opening 379 and adapted in one position of the piston to be in alignment with the annular groove 378. The cylinder head 384 is provided with an opening 385 to which is attached a conduit 386. The conduits 383 and 386 may be joined and connect with a conduit 387 (see Figure 10), which conduit 387 connects with an opening 388 and the cylinder 200. The cylinder 200 is also provided with a drain opening 389 and a pressure opening 390 connected to the header 216. The passages in the piston 201 for operating the conduit 387 are so designed that pressure is applied to the conduit 387 only in top gear and the conduit 387 is otherwise open to drain.

The cylinder 376 also houses a coil spring 391 mounted upon a rod 392 carried by the piston 377. The rod 392 extends through an opening 393 in the cylinder 358 and is adapted in one position to seat in the annular groove 361 in the piston 359.

The operation of the last described mechanism is as follows:

With the hand control 206 set in top drive, pressure is admitted from the conduit 38 leading from the pressure pump through the header 216, cylinder 200, to the conduit 387. This pressure is applied through the conduit 386 into the head of the cylinder 376, thus tending to move the piston 377 downwardly. As the piston moves downwardly against the force of the spring 391, the end of the rod 392 engages within the groove 361 of the piston 359 and locks the piston in position to maintain the brake 162 in released condition.

As the piston 377 thus moves downwardly the opening 382 is uncovered, thus permitting fluid under pressure in the conduit 383 to pass directly to the pressure release valve 381. The spring 394 of this valve is selected so as to maintain a pressure in the conduit 383 and correspondingly the conduit 386 only sufficient to overcome the force of the spring 391. Thus, the resistance to the pumping of the pressure pump 30 can be materially reduced and the drag which would otherwise be imposed upon the engine by this pump substantially eliminated.

The application of fluid under pressure by the conduit 224 is controlled by the needle valve 369 and the check valve 368. As the check valve offers substantially no resistance of the application of pressure, pressure can be applied quickly to disengage the brake 162, however engagement of the brake 162 under the force of the spring 371 is controlled to prevent grabbing of the brake by the needle valve 369 as the check valve 368 prevents passage of the fluid through the branch 366.

The springs 371 and 391 are selected so that the spring 391 is in all cases strong enough to disengage the end of the shaft 392 from the groove 361 when pressure is released from the conduit 386.

Referring now more particularly to Figure 4, there is shown a control designed to incorporate in one mechanism the cylinders 228 and 264, and associated mechanism. In this embodiment, a cylinder 400 is provided housing a piston 401. The piston 401 is provided with a shaft 402 extending through an opening 403 in the end of the cylinder and with a collar 404. A yoke 405 is provided on a shaft 406 operated by a hand brake as is the shaft 285. A shaft 407 is provided mounting a yoke 408 adapted to engage the left end of the piston 401. The shaft 407 is preferably attached and operated by a pedal similar to a conventional clutch pedal. The cylinder is provided with openings 409 and 410 to which are attached conduits 411 and 412 which are joined, communicating with the pressure line 38 by conduit 260. The cylinder 400 is further provided with an opening 413 to which is attached the conduit 220 and an opening 249 is provided to which is attached a conduit 252. Like numerals in Figures 4 and 10 serve like functions.

The valve piston 401 is worked fully to the left by the arm 405 operated by the hand brake and worked fully to the right by arm 408 operated by the clutch pedal described above. Spring 439 operates to move piston 401 to its center position where it is held by detent ball 437 as shown in Figure 4.

The cylinder 400 is further provided with a pair of drain openings 414 and 415 and an opening 416 to which is attached a conduit 221. An opening 250 is provided to which is attached a conduit 271a which replaces the conduits 253 and 271 and serves a function similar to the conduit 271. The cylinder is further provided with drain openings 417 and 418 and an opening 419 to which is attached a conduit 222. An opening 251 is provided to which is attached a conduit 272a which combines the functions of conduits 254 and 272.

A pair of drain openings 420 and 421 are provided and an opening 422 is provided to which is attached the conduit 223. An opening 423 is provided to which is attached a conduit 273.

The cylinder is further provided with openings 424 and 425 to which are attached conduits 426 and 427 which are joined to the conduit 260 which communicates with conduit 38 of the front pressure pump. An opening 428 is provided to which is attached a conduit 224. An opening 429 is provided to which is attached a conduit 224a.

The piston is provided with annular recesses indicated generally by the number 430.

A box like enlargement 431 is provided on the cylinder which is bored as at 432 and 433 to receive the springs 434 and 435 and balls 436 and 437. An annular groove 438 is formed in the piston 401 as shown. A coil spring 439 is interposed in the cylinder surrounding the shaft 402 and abutting the end of the cylinder on one end and the piston head on the other end, as shown, and a bleed hole 440 is provided in the cylinder 400.

The operation of the above described device is as follows:

In its normal position, the piston is positioned as shown in Figure 4 under the force of the spring 439 and retained therein by the ball or detent 437 seating in the groove 438. In this condition, each of the conduits 220, 221, 222, 223 and 224 is open, each communicating with its associated annular recess 430 and communicating any pressure that may exist in said conduit through to the conduits 252, 271a, 272a, 273 and 224a, respectively. In this condition, the operation of the various controls will depend upon the setting of the rotary valve formed by the cylinder 200 and piston 201, depending upon the position of the handle 206.

Upon actuation of the hand brake 601 to turn the shaft 406 so that the yoke 405 engaging the collar 404 is turned in a clockwise direction, the piston is moved to the left (Figure 4) to a position in which the ball or detent 436 engages within the groove 438. In this position, each of the openings 413, 416, 419, 422 and 428 is closed, the opening 409 is open, and power from the conduit 38 is passed to the conduit 252, the drain 414 is open, and consequently the line 271a is drained. The opening 417 is open and consequently the conduit 272a is drained. The drain 420 is open and consequently the conduit 273 is drained. The opening 424 is open and consequently power is applied by the conduit 260. In this condition, power is supplied by the conduit 252 to the front clutch to disengage this clutch. The line 271a leading to the front brake is drained and this brake disengaged by the spring 337. The conduit 272a is drained and hence the conduit 55 is drained, thus freeing the resistance pump. In this condition, the conduit 273 is drained, thus draining the conduit 131 and permitting the rear clutch to engage under the force of the coil springs 142. Finally, the conduit 224a is supplied with fluid under pressure from the conduit 38 to disengage the rear brake 162. The hand brake is simultaneously moving the shaft 320 to the left, thus engaging the cam 323 with a post 324 and applying the brake completely under the control of the operator, as the shaft 362 slides through the opening 450 in the post 424.

As hereinabove described, the operation of the hand brake has simultaneously rotated the shaft 93 to engage the yoke 92 with the collar 87 to disengage the front clutch. Thus, in this condition, the vehicle is held and the engine is freed for starting.

After the hand brake has been thus applied to condition the device for starting the engine and the engine has been started, the hand brake is released. The detent 436, however, will hold the piston 401 as placed by the hand brake until the clutch pedal 606 is depressed to rotate the shaft 407 in a counter-clockwise direction to engage the yoke 408 with the end of the piston to force the piston completely to the right.

The cylinder 400 is provided with a shoulder 451 to limit the movement of the piston 401 to the right. When the piston has thus been moved fully to the right, the same condition will prevail as when it was moved fully to the left, with the exception that the opening 410 replaces the opening 409, the drain 415 replaces the drain 414, the drain 418 replaces the drain 417, and the drain 421 replaces the drain 420, while the conduit 427 replaces the conduit 426. The operator may then release the clutch pedal which permits the piston to move slowly to the left under the influence of the spring 439 to restore the initial setting wherein the controls are dependent upon the setting of the handle 206. The dashpot action of bleed 440 steadies said movement.

Referring now to the device shown in Figure 15, the operation is as follows. For low gear the rear clutch is free and brake 162b holds stationary the drum 158b and the reaction sun 167b. Driving sun 157b rotates planets 166b backwardly. These in turn rotate planets 171b forwardly on sun 167b and planet carrier 164b and driven shaft 125b are rotated forwardly. In reverse, the rear clutch is free, brake 180 holds the reverse annulus 174b stationary. Driving sun 175b rotates planets 166b backwardly and planets 171b forwardly to carry the planet carrier and driven shaft 125b backwardly as planets 171b travel on the stationary annulus 174b.

Referring now more particularly to Figure 8, there is illustrated an alternative control method utilizing the resistance pump to soften the action of the front clutch and reduce the wear on the front clutch and while there will be described this device in connection only with the front clutch, it will be understood that a similar device can be utilized with respect to the rear clutch.

In this embodiment, the oil is not permitted to freely escape from the opening 48 of the torque valve, but this opening is communicated by a ring 600, or otherwise, to a closed conduit 500, which conduit is communicated to a new section 200b of the cylinder 200, which section is provided with an opening 501 to which the conduit 500 is attached. The piston 201 is in this case provided with an annular groove 502 and a recess 503, thus affording mechanism for either shutting off the conduit 500 or fully draining it. The conduit 55 constituting the other outlet for the resistance pump is taken to a new section 400b of the cylinder 400, which section is provided with an elongated opening 505, to which the conduit 55 is attached, a pair of drain openings 506 and 507 and an opening 508 to which a conduit 509 is attached. The piston 401 is provided with an annular recess 510.

The conduit 509 is connected with an opening 511 in the new section 200b of the cylinder 200, which section is also provided with a pair of drain openings 512 and 513 and with a further opening 514 to which is attached a conduit 515. The piston 201 is provided with an annular slot 516 and a pair of recesses 517 and 518. The dashpot comprises a cylinder 519 having a drain opening 520 and a piston 521.

The cylinder 519 has a reduced portion 522 provided with an inwardly extending annular shoulder 523 and an opening 524. A ball 525 is resiliently biased towards opening 524 by a coil spring 526. The cylinder is also provided with a bleed hole 527 and a coil spring 540.

The conduit 515 is branched into conduits 528 and 529, branch 528 communicating with the cylinder at 534 and branch 529 being provided with a check valve 535 and communicating with the cylinder 519 and 536. The entire mechanism just described is preferably submerged in the oil sump to prevent pumping of air.

The rate of movement of piston 521 in the control device shown in the lower portion of Figure 8 depends on the relative resistance offered to fluid flow by spring-biased ball 535 on the one hand and by the needle control 527 on the other. In construction spring 540 need only be strong enough to insure the return of piston 521 when fluid pressure is no longer operating against it.

With this device, the conduit 59 is preferably branched as at 530 and 531, the branch 530 being provided with a check valve 532 and the branch 531 being provided with a needle valve 533.

Said device thus provides for prompt disengagement of the front clutch while the rate of engagement of said clutch may be adjustably controlled.

The operation of the last described device is as follows: When it is desired to engage the front clutch, the escape of oil from the resistance pump from the conduit 55 is gradually resisted, the oil passing from the conduit 55 through the cylinder 400b, the conduit 509, the passage 516, the recess 518 and conduit 515 to the dashpot which slowly closes the piston 521, being forced against the force of the spring 540 until the piston closes the opening 520. It will be apprent that this takes place gradually and as the increase of resistance to the pump increases the speed of the planet carrier 109, the planet carrier is thus slowly brought to a rate at which its rotation approximates that of the annulus 111 and thus the front clutch when subsequently engaged needs only to bind two mechanisms which are then revolving at approximately the same speed. This action is termed the gear lock. The passages 516 and the recesses 517 and 518 are so located that the dashpot will operate prior to the engaging of the front clutch. The graduated passage 517 is provided in order that resistance to the flow from the outlet 55 of the front planetary pump may be varied manually as desired in hill-braking.

The gradual closing of the outlet 520 is effected by oil under pressure in the conduit 515. This oil passes to the branches 528 and 529. The check valve 535 in branch 529 is selected so that sufficient pressure is available to move the piston 521 towards closed position against the bias of spring 540. However the ball valve 525 permits rapid return of the piston 521 when no pressure is present in the conduit 515.

The new section 400b of the cylinder 400 is provided so that normally communication will be maintained between the conduit 55 and the conduit 509 permitting the rotary valve to control draining of the resistance pump, but as draining of the resistance pump is desired when the piston 401 is in either extreme position to the left or right, the openings 506 or 507 are provided for this purpose.

As the dashpot slowly builds up resistance to the pump, the torque valve then becomes operative, the escape from the torque valve will be fully open for automatic drive, or fully shut for all other conditions.

The opening 513 is so positioned so as to provide a variable restriction to the outlet which, as explained above, is utilized in hill braking.

The above described device can be simplified by the elimination of the resistance pump and consequently the broken shaft with its torque responsive valve and the various pump escape conduits and the valve 298.

With this construction the hand brake lever operating the shaft 406 and shaft 93 is used to cam off the front clutch to start the engine. This also moves piston 401 to the left (Figure 4) to open up opening 409 to supply oil under pressure to conduit 252 to disengage the front clutch when the hand brake is taken off (the piston remaining to the left under restraint of the ball 436). This also opens conduit 414 which drains the front brake which is then held off by the spring 337. Simultaneously, the rear brake 162 is applied (see Figure 6) and as the rear clutch is spring applied (the indicator 207 being at neutral) the driven shaft 125 is held.

The front clutch remains off as in neutral, oil under pressure is supplied to conduit 252 and the hand brake may be released. The clutch pedal may now be depressed to actuate the shaft 407 and move the piston 401 to the right against the force of spring 439. The conduit 252 is supplied, but not through opening 410 so the front clutch remains disengaged while the conduit 271 is drained through opening 415 so that the front brake is off. The engine is thus free.

If the indicator 207 is now moved to first gear the rotary valve or piston 201 is moved admitting pressure to conduit 221 and as the clutch pedal is released the piston 401 is returned to central position by spring 439 applying pressure to conduit 271 and applying the front brake. If the clutch pedal is released slowly pressure is applied to the brake cylinder 335 slowly and as the front and rear clutches are both disengaged in first by pressure and the rear brake spring applied, the conduit 224 being drained, the vehicle proceeds in first gear.

This simplified construction retains the automatic brake which is engaged when the engine is off; the feature of preventing starting the engine in gear; four forward gears and two in reverse; four gears for hill braking, using the engine; the elimination of fluid coupling or torque converter; free wheeling when the clutch pedal is depressed; positive disconnection of the engine for starting; no creeping; the hand operated cam 328 for holding off the rear brake for towing or push starting; the hand brake which holds the vehicle independently of the automatic brake and which also disengages the front clutch for towing; the provision for holding the car stationary in neutral without creeping and without the use of the hand brake or brake pedal, and yet eliminates any complex controls subject to seizure or mechanical failure or dependent on opposing fluid pressures.

While there has been described what at present is considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What is claimed is:

1. In a power transmission in a motor vehicle, in combination: a drive shaft; a driven shaft; a fluid pump supplying fluid pressure; a planetary gearset having a sun gear, planet gears, a planet carrier and an annulus gear; a direct connection from said drive shaft to a member of said gearset; a brake to check the rotation of another member of said gearset, said brake being held disengaged by fluid pressure from said fluid pump; a clutch spring biased to engagement and serving to connect two members of said gearset to lock said gearset and to connect said drive shaft to said driven shaft for unitary rotation; a direct connection from a third member of said gearset to said driven shaft; hydraulic mechanism in connection with said clutch; valve means in connection with said hydraulic mechanism; an operator's gear-selector handle serving for the control through said valve means of said hydraulic mechanism; and a manually operated lever operably connected to said brake to apply said brake and check the movement of the motor vehicle when said clutch is engaged; and a second valve, placed between said valve means and said hydraulic mechanism; said lever, when opearted to apply said brake, actuating said second valve to directly drain said hydraulic mechanism in any setting of said handle and the first said valve means; thus serving to insure the engagement of said clutch at the same time that said lever mechanically applies said brake.

2. A power transmission as set forth in claim 1 wherein: said brake is provided with a piston and a cylinder; said cylinder receiving fluid pressure from said fluid pump and operative to disengage said brake; spring means normally biasing said brake towards engaged position and manually controlled valve means for controlling the application of fluid pressure to said cylinder, whereby said brake is spring applied and hydraulically disengaged; said spring application of said brake and the said spring-engagement of said clutch occurring upon failure of said cylinder and said hydraulic mechanism to receive said fluid pressure.

3. A power transmission as set forth in claim 2 wherein: said manually operated lever is operable to apply said brake irrespective of whether fluid pressure or drainage is being applied to said cylinder.

4. A power transmission as set forth in claim 2 including: a manually operated mechanism operative independently of the supply of fluid pressure to said cylinder and of the manually operated lever to prevent engagement of said brake.

5. A power transmission as set forth in claim 2 including: a third shaft operably connecting said drive shaft to the source of power; a front clutch serving to connect said third shaft to said drive shaft; and means operated by said manually operated lever and operable on operation of said lever to disengage said front clutch to free said drive shaft from said third shaft.

6. A power transmission as set forth in claim 2 including: a third shaft operably connecting said drive shaft to the source of power; a front clutch serving to connect said third shaft to said drive shaft; a cylinder and a piston operatively associated with said front clutch, said cylinder receiving fluid pressure from said fluid pump to disengage said front clutch; said valve means having a neutral position whereby said front clutch is disengaged, first said clutch is engaged, and said brake is engaged irrespective of operation of said manually operated lever.

7. In a power transmission in a motor vehicle, in combination: a drive shaft and a driven shaft; a planetary gearset having sun gear, planet gears, a planet carrier and an annulus gear; said drive shaft being connected to a member of said gearset; braking means to check rotation of another member of said gearset and providing a reaction gear; clutch means operative to lock the members of said planetary gearset for unitary rotation, said clutch means serving to connect said drive shaft to said driven shaft; a fluid pressure pump; hydraulic means associated with said clutch and adapted to receive pressure from said pump to disengage said clutch; spring means normally biasing said clutch means to engaged position; a manually operated member; and means operably connecting said manually operated member with said clutch means to mechanically disengage said clutch.

8. In a power transmission, in combination; a drive shaft adapted to receive torque from an engine; an intermediate shaft and a driven tailshaft; a pump supplying fluid pressure; a front planetary gear assembly having a sun gear, planet gears, a planet-gear carrier and an annulus gear; a direct drive from said drive shaft to the annulus gear in said assembly; braking means to hold stationary the sun gear in said assembly; a direct connection from said carrier to said intermediate shaft; front clutch means to connect said drive shaft to said intermediate shaft for unitary rotation; a rear planetary assembly having a sun gear directly driven by said intermediate shaft, planet gears driven by said sun gear, planet-gear carrier means directly connected with the said driven tailshaft, and a reaction gear on which said planet gears work to rotate said latter carrier means in low forward drive; braking means to hold said reaction gear stationary; spring means normally biasing said latter braking means to engaged position and hydraulically operated means serving to restrain said latter braking means from engagement; clutch means serving to connect two members of said rear assembly and thereby lock said assembly to provide unitary rotation; said latter clutch means serving to connect said intermediate shaft and said driven tailshaft in a direct drive; spring means normally biasing said latter clutch means to the engaged position; hydraulically operated means serving to restrain said latter clutch means from engagement when the gears of said gear assembly are working on one another in low ratio drive; and manually operated means serving mechanically to restrain said rear braking means from engagement when said fluid pressure is not available.

9. A power transmission as set forth in claim 8 including; spring means normally biasing said front clutch means to the engaged position; hydraulic means operable to restrain said front clutch means from engagement; spring means normally biasing first-said braking means to the disengaged position; hydraulic means operable to apply the first-said braking means; another reaction gear in said rear assembly with which the said rear planetary gears work to provide reverse rotation of their supporting carrier means which is directly connected with the said driven tailshaft; and braking means serving to hold the latter reaction gear stationary.

10. A power transmission as set forth in claim 9 including; manual means for controlling the hydraulic operation of the said front clutch means, the said front braking means, the said rear clutch means and the said rear braking means; and means for manually controlling the operation of the braking means associated with the latter said reaction gear to provide reverse drive, whereby selectively may be applied four forward gear ratios and two reverse gear ratios between said drive shaft and said driven tailshaft.

11. A power transmission as set forth in claim 10 in which; gears in said front gear assembly are enclosed to form a fluid pump; an inlet and an outlet for said latter pump; a spring-biased valve automatically operated by fluid pressure and serving to control said outlet; restriction of said outlet serving to resist the rotation of the gears forming said pump, thereby varying the ratio of the drive between the said drive shaft and the said intermediate shaft; and means to control the rate of closure of said outlet.

12. A power transmission as set forth in claim 10 including; means to manually disengage the said front clutch, said disengagement serving to free the engine when the said front braking means is also disengaged by its associated spring means.

13. A power transmission as set forth in claim 10 including; a movable valve operable in one position to supply pressure to the hydraulic mechanism which restrains the said front clutch from engagement thus serving to free the engine from its drive when the said front braking means is also disengaged by its associated spring means; and a foot pedal operably connected with the said valve to move said valve into the said position.

14. In a power transmission, in combination; a shaft receiving torque from an engine and a driven shaft; a planetary gear assembly; a sun gear in said assembly directly driven by first said shaft; a first series of planet gear meshing with said sun gear; a second series of planet gears meshing with said first series; a planet carrier supporting both said series of planet gears and directly connected with said driven shaft; an annulus gear meshing with said second series of gears; a rotatable member integral centrally with a second sun gear and fitted peripherally with a brake drum; said second sun gear meshing with said second series of planet gears; braking means to hold stationary the said brake drum to provide for low ratio forward drive; braking means to hold said annulus gear stationary to provide reverse rotation of said driven shaft; and clutch means to connect said rotatable member with first said shaft and serving by locking the gears of said planetary assembly to connect first said shaft with said driven shaft to provide a direct drive.

15. In a power transmission, in combination: a planetary assembly having members including a sun gear, an annulus gear, planet gears and a rotatable planet-gear carrier; a drive shaft connected with one of the said members; a driven shaft connected with another of the said members; gears in said assembly being enclosed to form a fluid pump; an inlet and an outlet for said pump; valve means acting automatically to variably restrict said outlet; spring means biasing said valve means to initial position;

and manual control means serving to make said valve means operative; wherein said valve means is automatically responsive to variations in the transmitted torque; said valve means acting to allow an increase in flow from said pump when the torque transmitted is increased; said increase providing reduced resistance to the rotation of the gear members forming said pump; thereby providing a lower speed ratio in the drive between said shafts; said valve means being normally biased toward closure by the said spring means; wherein one of the said shafts is divided into two parts; spring means interposed between said parts and adapted to be compressed upon the passage of increased torque; an opening between said parts; said opening acting as a valve to control the flow from said pump; the two said parts being movable relatively to one another in response to variations in the amount of torque transmitted; the amount of said torque thus determining the amount of flow from said pump and the speed ratio present in the drive between said shafts.

16. In a power transmission, in combination: a planetary assembly having members including a sun gear, planet gears, an annulus gear and a planet-gear carrier; a drive shaft connected with one of said members; a driven shaft connected with another of said members; gears in said assembly being encased to form a fluid pump; an inlet and an outlet for said pump; a valve serving to variably restrict the flow from said outlet; said restriction tending to restrain the gears forming said pump from relative rotation; centrifugal means operated in association with said driven shaft; a member actuated by said centrifugal means and serving, with increasing rotation of said driven shaft, to position said valve to increasingly restrict the flow from said pump; a throttle pedal; a member connected with said throttle pedal and operating on increasing opening of said throttle to position said valve to increase the flow from said pump; a cross-link connecting said members; a connection from said valve to a part of said cross-link intermediate the ends; said members acting with one another through the medium of said cross-link to variably operate said valve.

17. In power transmissions, more particularly in self-propelled vehicles, in combination: a planetary gear assembly having a sun gear, planet gears, a planet-gear carrier and a ring gear; braking means serving to check the rotation of a member of said assembly; a manual control for the engagement of said braking means; gears in said assembly being enclosed to form a fluid pump; an inlet and an outlet for said pump; valve mechanism serving to variably restrict the fluid flow from said outlet; a manual control for the operation of said valve mechanism; a shaft operably connected with a second member of said assembly and with the driving wheels of the vehicle; the restriction of said flow, when said braking means is engaged, serving to provide a variable resistance to the relative rotation of the gear members forming said pump; thereby serving to provide an infinitely variable fluid brake to the rotation of said shaft and said wheels; and practically complete locking of said gear members and said shaft occurring when said valve mechanism completely stops the fluid flow from said pump.

18. In a power transmission, more particularly in a self-propelled vehicle, in combination: an engine-driven shaft, a second shaft and a third shaft; clutch means, spring-biased to engagement, serving to directly connect said first shaft to said second shaft for unitary rotation; manual means serving to mechanically disengage said clutch means; a planetary gear assembly serving to provide a reduced drive between said second shaft and said third shaft; clutch means spring-biased to engagement and locking the gears of said assembly when engaged and serving to connect said second shaft to said third shaft for unitary rotation; brake means to check the rotation of a member of said assembly and operative, when said latter clutch means is engaged, to hold said third shaft stationary; and manual means serving mechanically to restrain said brake means from application; said latter manual means being operable to condition said transmission for a push or pull start, both of the said manual means being operated to free the engine for towing, when the said engine is dead.

19. A power transmission as set forth in claim 14, including a source of fluid pressure; said first braking means being spring-biased to engagement and disengaged by said fluid pressure; and manual means serving mechanically to restrain said first braking means from engagement at the will of the operator of the vehicle.

20. In a power transmission, in combination, a shaft receiving torque from an engine and a driven shaft; a planetary gear assembly; a sun gear in said assembly directly driven by first said shaft; a first series of planet gears meshing with said sun gear; a planet-carrier supporting said series of planets and directly connected with the said driven shaft; a rotatable member having an annular portion fitted on the outside with braking means and on the inside with gear teeth which mesh with said planet gears; a second sun gear; said rotatable member being integral with said second sun gear; a second series of planet gears meshing with the said second sun gear; a planet-carrier supporting said second series of gears and directly connected with the said driven shaft; a second annular member supported centrally and having on its periphery external braking means and internally fitted with gear teeth; said latter teeth meshing with the said second series of planets; braking means to hold the first said annulus gear stationary for low ratio forward drive; and braking means to hold said second annulus gear stationary to provide reverse rotation of said driven shaft; clutch means to connect said rotatable member with first said shaft and serving by locking the gears of said planetary assembly to connect first said shaft with said driven shaft to provide a direct drive; a pump supplying fluid pressure and manually operated means serving mechanically to restrain said braking means from engagement; said braking means and said clutch means being spring-biased to engagement and disengaged by said fluid pressure.

21. In a power transmission in a motor vehicle, in combination: a drive shaft and a driven shaft; planetary gearing serving to connect said shafts in a plurality of drive ratios; a pump supplying fluid pressure; clutching means operable to connect said shafts for unitary rotation; spring means serving to provide engagement of said clutching means; hydraulic mechanism operated by said fluid pressure and serving for the disengagement of said clutching means; braking means in connection with said planetary gearing serving for the provision of modified driving between said shafts; spring means biasing said braking means to engagement; hydraulic mechanism using said fluid pressure, in the disengagement of said braking means; valve means serving to control the operation of said clutching means and said braking means; fluid pressure operated mechanism serving to hold the said braking means from application when the said valve means is actuated for the engagement of said clutching means in the provision of a direct drive between said shafts; said fluid pressure operated mechanism, while it serves to hold the said braking means in an inoperative position, serving also to provide a substantial escape for the flow from said fluid pump thereby appreciably lessening the said fluid pressure and so reducing the drag effect of said pump on the operation of said transmission.

22. In a power transmission in a motor vehicle, in combination: a drive shaft and a driven shaft; planetary gearing between said shafts; braking means serving to check the rotation of a member of said planetary gearing to provide modified driving between said shafts; clutching means serving to connect said shafts; a hand brake lever; a swinging arm connected at one point to said clutching means; at a second point to said braking means; and at a third point to said hand brake lever; said swinging arm, when operated by the actuation of said hand brake lever, serving to mechanically disengage said clutching means and to mechanically provide application of said braking means.

23. A power transmission as set forth in claim 22, including means to restrain said braking means from application by said hand brake lever when said lever is operated for the disengagement of said clutching means.

References Cited in the file of this patent

UNITED STATES PATENTS

| | | |
|---|---|---|
| 1,256,373 | Rowledge | Feb. 12, 1918 |
| 1,364,392 | Macho | Jan. 4, 1921 |
| 1,754,385 | Johnson | Apr. 1, 1930 |
| 1,961,619 | McLain | June 5, 1934 |
| 1,975,626 | Tibbetts | Oct. 2, 1934 |
| 2,085,897 | Burrows | July 6, 1937 |
| 2,135,722 | Lee | Nov. 8, 1938 |
| 2,154,710 | Thoma | Apr. 18, 1939 |
| 2,177,302 | Lawrence | Oct. 24, 1939 |
| 2,204,872 | Thompson | June 18, 1940 |
| 2,248,942 | Black | July 15, 1941 |
| 2,261,898 | Barkeij | Nov. 4, 1941 |
| 2,371,228 | Dodge | Mar. 13, 1945 |
| 2,371,229 | Dodge | Mar. 13, 1945 |
| 2,377,696 | Kelley | June 5, 1945 |
| 2,430,258 | Thompson | Nov. 4, 1947 |
| 2,468,155 | Backus | Apr. 26, 1949 |
| 2,606,459 | Carnegie | Aug. 12, 1952 |
| 2,625,057 | Kelbel | Jan. 13, 1953 |

FOREIGN PATENTS

| | | |
|---|---|---|
| 300,667 | Great Britain | Nov. 9, 1928 |